US011296883B2

(12) United States Patent
Liu et al.

(10) Patent No.: US 11,296,883 B2
(45) Date of Patent: Apr. 5, 2022

(54) NEIGHBOR AWARENESS NETWORKING PASSWORD AUTHENTICATION

(71) Applicant: Apple Inc., Cupertino, CA (US)

(72) Inventors: Yong Liu, Campbell, CA (US); Tashbeeb Haque, San Francisco, CA (US); Christiaan A. Hartman, San Jose, CA (US); Lawrie Kurian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 16/586,224

(22) Filed: Sep. 27, 2019

(65) Prior Publication Data

US 2020/0195438 A1 Jun. 18, 2020

Related U.S. Application Data

(60) Provisional application No. 62/779,699, filed on Dec. 14, 2018.

(51) Int. Cl.
| | |
|---|---|
| *H04L 29/06* | (2006.01) |
| *H04L 9/32* | (2006.01) |
| *H04W 8/00* | (2009.01) |
| *H04L 9/08* | (2006.01) |
| *H04L 9/06* | (2006.01) |
| *H04L 69/24* | (2022.01) |

(52) U.S. Cl.
CPC .......... *H04L 9/3226* (2013.01); *H04L 9/0618* (2013.01); *H04L 9/0643* (2013.01); *H04L 9/0863* (2013.01); *H04L 69/24* (2013.01); *H04W 8/005* (2013.01)

(58) Field of Classification Search
None
See application file for complete search history.

(56) References Cited

U.S. PATENT DOCUMENTS 10,298,461 B2 * 5/2019 Gupta ................. H04L 67/1044
2015/0350866 A1 * 12/2015 Patil .................... H04W 40/244
370/254

(Continued)

OTHER PUBLICATIONS

Rao, KN Hemanth et al. Secure Handshake Mechanism for Autonomous Flying Agents Using Robust Cryptosystem. 2017 2nd International Conference on Computational Systems and Information Technology for Sustainable Solution (CSITSS). https://ieeexplore.ieee.org/stamp/stamp.jsp?tp=&arnumber=8447729 (Year: 2017).*

(Continued)

*Primary Examiner* — Jeremiah L Avery
(74) *Attorney, Agent, or Firm* — Kilpatrick Townsend & Stockton LLP

(57) ABSTRACT

An apparatus comprises a memory and at least one processor in communication with the memory. The at least one processor is to detect, during a discovery window, a neighboring client station that is to perform peer-to-peer Wi-Fi communication via a Neighbor Awareness Networking (NAN) protocol and establish, via a negotiation after the discovery window, a datapath with the neighboring client station, wherein the negotiation includes an exchange of NAN data path setup attributes in parallel with an exchange of encryption cipher attributes and the encryption cipher is based on a simultaneous authentication of equals (SAE) protocol. The SAE protocol can be used to generate key material to encrypt the datapath.

20 Claims, 10 Drawing Sheets

(56) References Cited

U.S. PATENT DOCUMENTS

| | | | | |
|---|---|---|---|---|
| 2015/0350906 | A1* | 12/2015 | Patil | H04L 45/12 |
| | | | | 713/168 |
| 2016/0073330 | A1* | 3/2016 | Patil | H04W 88/04 |
| | | | | 709/220 |
| 2016/0165653 | A1 | 6/2016 | Liu et al. | |
| 2016/0285630 | A1* | 9/2016 | Abraham | H04W 12/03 |
| 2016/0323925 | A1* | 11/2016 | Alanen | H04W 8/005 |
| 2017/0208531 | A1* | 7/2017 | Huang | H04W 72/1231 |
| 2017/0280377 | A1* | 9/2017 | Patil | H04W 12/0433 |
| 2018/0041946 | A1* | 2/2018 | Park | H04L 63/08 |
| 2018/0359633 | A1 | 12/2018 | Liu et al. | |

OTHER PUBLICATIONS

Al-Jaroodi, Jameela et al. A Survey of Security Middleware for Pervasive and Ubiquitous Systems. 2009 International Conference on Network-Based Information Systems. https://ieeexplore.ieee.org/stamp/stamp.jsp?tp=&arnumber=5349902 (Year: 2009).*

PCT/US2019/062754, "Notification of Transmittal of the International Search Report and the Written Opinion of the International Searching Authority, or the Declaration", dated Feb. 28, 2020, 6 pages.

"International Search Report," dated Feb. 28, 2020 in International Application No. PCT/US2019/062754. 9 pages.

"International Preliminary Report of Patentability," dated Jun. 24, 2021 in PCT International Patent Application No. PCT/US2019/062754. 7 pages.

Yoshihiro Ohba et al., "A Survey on Mesh Network Security," IEEE 802.21 Media Independent Handover, DCN: 21-11-0084-01-0000, May 16, 2011, 22 pgs.

IEEE Standards Association, "Part 11: Wireless LAN Medium Access Control (MAC) and Physical Layer (PHY) Specifications," IEEE Computer Society, IEEE Std. 802. Nov. 2016, New York, NY 2016, 14 pgs.

* cited by examiner

1000

```
┌─────────────────────────────────────────────────────────┐
│ Detecting, during a discovery window, a neighboring     │
│ client station that is to perform peer-to-peer Wi-Fi    │
│ communication via a Neighbor Awareness Networking       │
│ (NAN) protocol                                          │
│ 1002                                                    │
└─────────────────────────────────────────────────────────┘
                              │
                              ▼
┌─────────────────────────────────────────────────────────┐
│ Negotiating, after the discovery window, NAN protocol   │
│ parameters for a datapath with the neighboring client   │
│ station                                                 │
│ 1004                                                    │
└─────────────────────────────────────────────────────────┘
                              │
                              ▼
┌─────────────────────────────────────────────────────────┐
│ Generating key material to encrypt the datapath using   │
│ the SAE protocol based on a binary password that is     │
│ generated via a hash function                           │
│ 1006                                                    │
└─────────────────────────────────────────────────────────┘
                              │
                              ▼
┌─────────────────────────────────────────────────────────┐
│ Establishing the datapath with the neighboring client   │
│ station                                                 │
│ 1008                                                    │
└─────────────────────────────────────────────────────────┘
                              │
                              ▼
┌─────────────────────────────────────────────────────────┐
│ Store a portion of the key-material to enable           │
│ subsequent re-setup of the datapath                     │
│ 1010                                                    │
└─────────────────────────────────────────────────────────┘
```

*FIG. 10*

NEIGHBOR AWARENESS NETWORKING PASSWORD AUTHENTICATION

CROSS-REFERENCE

This application claims benefit of U.S. Provisional Patent Application No. 62/779,699 filed Dec. 14, 2018, which is hereby incorporated herein by reference.

FIELD

Embodiments described herein relate generally to neighbor awareness networking and more specifically to neighbor awareness networking password authentication.

BACKGROUND OF THE DESCRIPTION

Encryption can be used to secure data communication channels against eavesdropping. Password or passphrases are often used as entropy for the encryption algorithm that is used to secure a data channel. However, passwords or passphrases that are not sufficiently complex may be vulnerable to brute force cracking, dictionary attacks, or other types of attacks against the password or passphrase, which can compromise the security of the data communication channel.

SUMMARY OF THE DESCRIPTION

Various embodiments and aspects of neighbor awareness networking password authentication will be described herein. One embodiment provides for an apparatus comprising a memory and at least one processor in communication with the memory. The at least one processor can detect, during a discovery window, a neighboring client station that is to perform peer-to-peer Wi-Fi communication via a Neighbor Awareness Networking (NAN) protocol and establish, via a negotiation after the discovery window, a datapath with the neighboring client station, wherein the negotiation includes an exchange of NAN datapath setup attributes in parallel with an exchange of encryption cipher attributes and the encryption cipher is based on a simultaneous authentication of equals (SAE) protocol. The SAE protocol can be used to generate key material to encrypt the datapath.

One embodiment provides for a non-transitory machine-readable medium storing instructions to cause one or more processors of an electronic device to perform one or more operations comprising detecting, during a discovery window, a neighboring client station that is to perform peer-to-peer Wi-Fi communication via a Neighbor Awareness Networking (NAN) protocol, negotiating, after the discovery window, NAN protocol parameters for a datapath with the neighboring client station, wherein the negotiating includes exchanging NAN data path setup attributes in parallel with an exchange of attributes for an encryption cipher, the encryption cipher is based on a simultaneous authentication of equals (SAE) protocol, generating key material to encrypt the datapath using the SAE protocol, and establishing the datapath with the neighboring client station.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Various embodiments and aspects of a private federated learning system will be described herein, with reference to details discussed below. The described embodiments are illustrated by way of example and not limitation in the figures of the accompanying drawings, in which like references indicate similar elements, and in which:

FIG. 10 is a flow diagram illustrating a method that enables a NAN compact SAE protocol, according to an embodiment.

DETAILED DESCRIPTION

Neighbor Awareness Networking Password Authentication can be performed using a pairwise master key that can be derived from a key word or key phrase that is known to both NAN peers. PMK-based security is effective but can be improved. Embodiments described herein provide techniques to improve the security of NAN data path establishment without introducing major changes to the primitives and APIs provided by the Neighbor Awareness Networking Specification (e.g., NAN version 3.0). In one embodiment, NAN data paths are established and secured using simultaneous authentication of equals (SAE). Instead of using a pre-shared PMK or static NFC code, a PMK is derived by using asymmetric (public/private keys) cryptographic techniques between the devices that are to establish the secured data path. An attacker will be unable to determine either the password or the resulting PMK via brute force cracking, dictionary attacks, or other types of attacks against the password or passphrase.

Reference herein to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order than illustrated.

Figure 1:
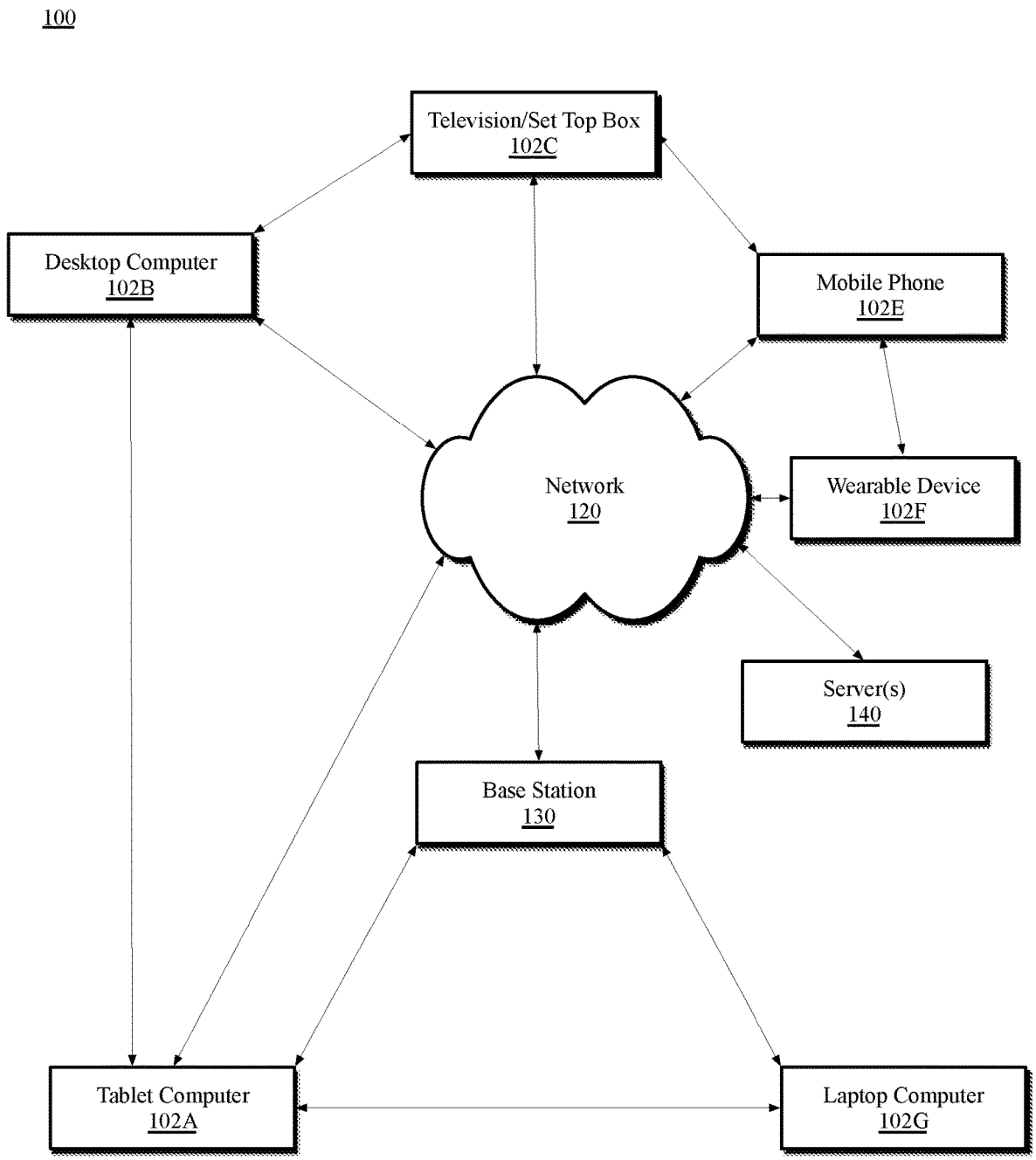
FIG. 1 is a schematic illustration of an overview of a network environment in which data can be exchanged between multiple devices, according to some embodiments.

FIG. 1 is a schematic illustration of an overview of a network environment 100 in which data can be exchanged between multiple devices, according to some embodiments. The network environment 100 can include one or more electronic devices such as a tablet computer 102A, a desktop computer 102B, a television or set top box 102C, a mobile phone device 102E, wearable device 102F, and/or a laptop computer 102G, which may be referred to collectively as electronic devices 102. In one embodiment, electronic devices 102 within range of one another can establish a direct or peer-to-peer communication channel via a direct communication link (e.g., Bluetooth, infrared (IR), Wi-Fi, etc.). The direct or peer to peer communication channel can be established between devices using a neighbor awareness networking (NAN) protocol. The NAN protocol enables wireless devices to form NAN clusters and communicate over a NAN network. A NAN Network comprises NAN Devices that share a common set of NAN parameters that include: the time period between consecutive Discovery Windows, the time duration of the Discovery Windows, the beacon interval, and NAN Discovery Channel(s). A NAN cluster is a collection of NAN devices that share a common set of NAN parameters and are synchronized to the same Discovery Window schedule. A NAN Device can send multicast NAN Service Discovery frames directly to other NAN devices within range in the same NAN Cluster during the Discovery Window. A NAN Device can send unicast NAN Service Discovery frames directly to any other NAN Device within range in the same NAN Cluster during the Discovery Window.

In addition to peer-to-peer connections, the electronic devices 102 can be connected to a network 120, either directly or via a connection to a base station 130. The base station 130 can be, for example, a network access device (e.g., a router, cellular base station or the like) which provides the electronic devices 102 with network access. The network 120 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 120 can be performed using network protocols such as, but not limited to transmission control protocol (TCP) and Internet protocol (IP).

Before a peer-to-peer communication channel is established between electronic devices 102, a peer discovery and pairing process is performed between the devices. The peer discovery process enables the electronic devices 102 to discover and preemptively establish connections between before data is available to be synchronized between the electronic devices 102. The peer discovery process, in some instances, can also include user verification that communication the electronic devices 102 should occur. In some embodiments, peer discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, electronic devices that are attached to a power source, such as an electrical outlet, can continuously perform advertisement and discovery for the peer-to-peer connection service. Mobile user devices can enable discovery of the peer-to-peer connection service based on the location of the user device. When one of the electronic devices 102 is discovered by another one of the electronic devices 102, a network data connection (e.g., TCP, UDP, etc.) can be established between the devices.

In one embodiment, some devices, such as the wearable device 102F (e.g., electronic watch device or another wearable electronic accessory) can synchronize data over a peer-to-peer channel with another device (e.g., a mobile phone device 102E) while also synchronizing data via a connection over a network-centric channel via the network 120. For example, the wearable device 102F can have a primary synchronization channel with a companion electronic device, such the mobile phone device 102E. The wearable device 102F can also receive synchronization data while the wearable device 102F is charging. In one embodiment, some data to be synchronized with the wearable device 102F can be synchronized with the mobile phone device 102E or another companion device. Dividing synchronization duties between the wearable device 102F and the mobile phone device 102E can enable rich data to be delivered to the wearable device 102F in a timely manner without negatively impacting the power and performance of the wearable device 102F.

Figure 2:
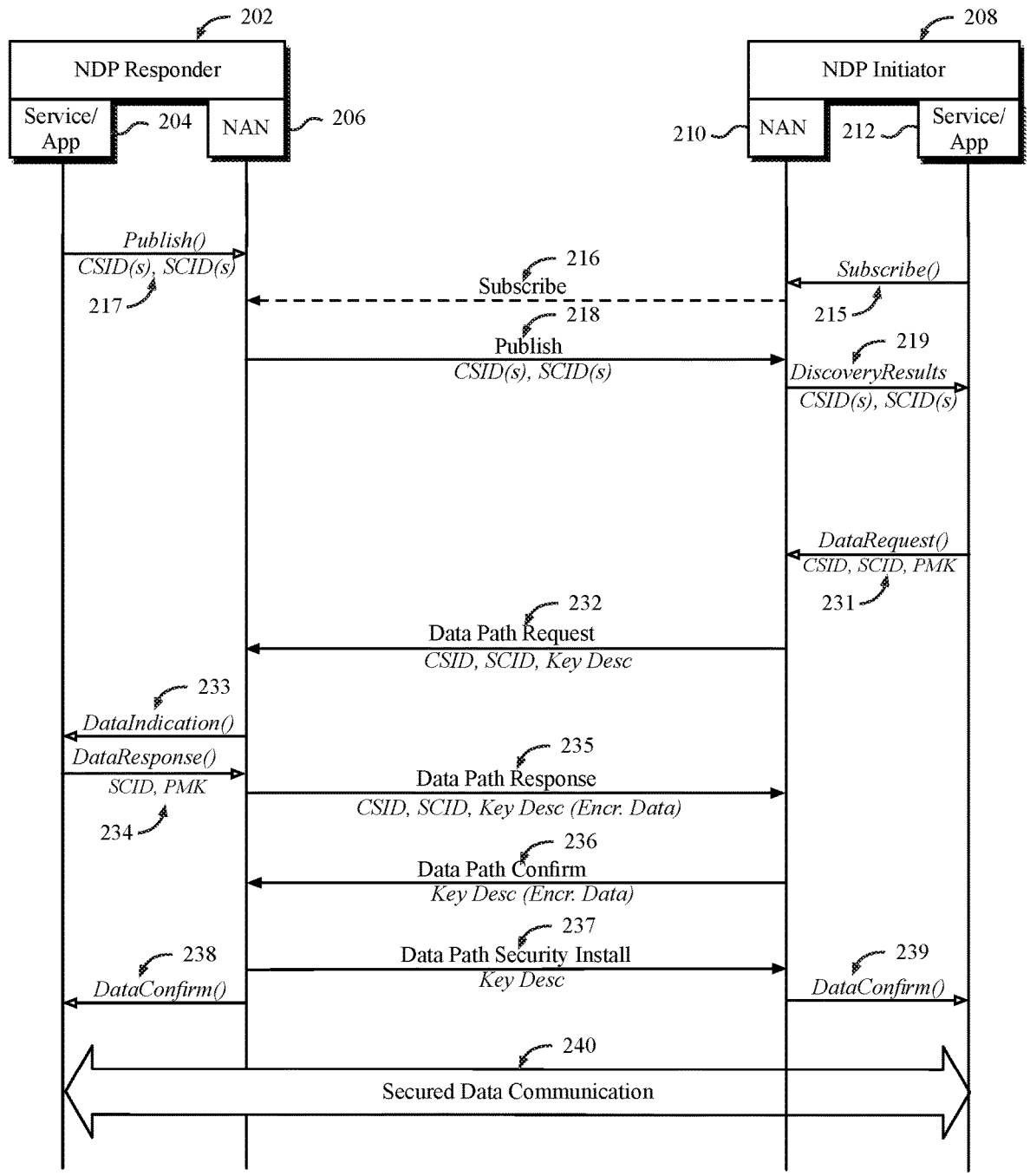
FIG. 2 illustrates a system in which NAN publish/subscribe message flow can be performed.

FIG. 2 illustrates a system 200 in which NAN publish/subscribe message flow can be performed. To enable security for the NAN data path, an authentication system can be used. In one embodiment the authentication system is a shared-key based protocol, for example, as introduced in NAN protocol version 2.0. NDP security setup supports multiple techniques to authenticate peer devices and establish appropriate cryptographic keys. Multiple cryptographic methods are supported using cipher suites that describe the set of algorithms and processing. The cipher suites may be based on either symmetric (shared secret key) or asymmetric (public/private keys) cryptographic techniques. The cipher suites are identified by cipher suite identifiers (CSIDs). Furthermore, a security context identifier (SCID) can also be used to identify the context of the security setup and identifies any long-term keys that are used to establish a security association. The security association can be established using a pairwise master key (PMK), which can be derived from a key word or key phrase that is known to both NAN peers.

A NAN data path (NDP) responder 202 can include an upper software layer that includes service and application logic (e.g., service/app layer 204) and a NAN system 206 that can include NAN host and firmware logic, where the NAN host can include one or more wireless hardware systems. An NDP initiator 208 can include a NAN system 210 and upper software layers (e.g., service/app layer 212) that are similar to those of the NDP responder 202.

Service/app layer 204 of the NDP responder 202 (e.g., Publisher) can advertise supported CSID(s) and SCID(s) via a publish message 217 to the NAN system 206, which in turn can broadcast wireless publication messages 218. The NAN system 210 on an NDP initiator 208 (e.g., subscriber) can also transmit a subscribe message 216 in response to a subscribe message 215 received from service/app layer 212.

A discovery results message 219 containing published CSID(s) and SCID(s) is relayed from the NAN system 210 to the service/app layer 212 of the NDP initiator 208. Service/app layer 212 can select a suitable CSID and SCID and send a data request message 231 to NAN system 210 that includes the PMK associated with the SCID.

A four-way handshake (Data Path Request, Response, Confirm and Security Install) can then be used to verify the PMK and install a pairwise transient key (PTK), which is derived from the PMK. NAN system 210 can first transmit a data path request message 232 including the selected CSID, SCID, and a key descriptor that contains key related information. A data indication message 233 and data response message 234 are exchanged between service/app layer 204 and NAN system 206, where data response message 234 includes the SCID and the PMK associated with the SCID. NAN system 206 of the NDP responder 202 can then transmit a data path response message 235 including the CSID, SCID, key descriptor, and optional encrypted data, which can be encrypted key data. NAN system 210 can reply with a data path confirm message 236 including the key descriptor and optionally encrypted key data. NAN system 206 can then transmit a data path security install message 237 to NAN system 210. NAN system 206 and NAN system 210 can then send respective data confirm messages 238, 239 to service/app layer 204 and service/app layer 212. The NDP responder 202 and NDP initiator 208 can then established a secured data communication channel 240.

PMK-based security is effective but can be improved. For example, if the PMK is derived using a static password or pass-phrase, the PMK may be vulnerable to a brute force key space search attack. Furthermore, a long-term shared PMK may suffer from weak perfect forward secrecy, meaning past sessions may be vulnerable to future compromises of secret keys. Some of these shortcomings may be overcome in the NAN context by using a PMK derived by asymmetric (public/private keys) cryptographic techniques. In one proposed implementation, a secured NAN data path setup can be performed between devices using a negotiated NFC connection handover in which establishment of a secured NAN data path is negotiated over NFC. In a negotiated NFC handover, one NFC capable device can propose a set of carriers, security settings, and corresponding security material (such as its public key); and the other NFC capable device can select one of the proposed carriers, one security setting, and corresponding security material (such as its public key). An asymmetric cryptographic technique, such as Diffie-Hellman scheme, can then be used to derive a PMK. A four-way handshake can then be used to verify the PMK and install a pairwise transient key (PTK), which is derived from the PMK. The PTK is then used to secure the negotiated NAN data path.

Due to device capability limitations, some device to device communications cannot be performed using negotiated NFC connection handovers and are limited to the use of a one-way authentication methods. One-way authentication methods include the entry of a password, passphrase, or passcode that enables the establishment of a direct data connection. A user with a mobile device can scan a QR code that represents a password, passphrase, or passcode. A device can also use near-field communication (NFC) to perform a static NFC connection handover. A static NFC handover can occur between an NFC reader and an NFC tag that contains a static handover message, which may carry a password, passphrase, or passcode. The NFC reader can analyze the handover message and if the message contains valid data for a carrier that the device supports, the device can initiate a corresponding connection.

Figure 3:
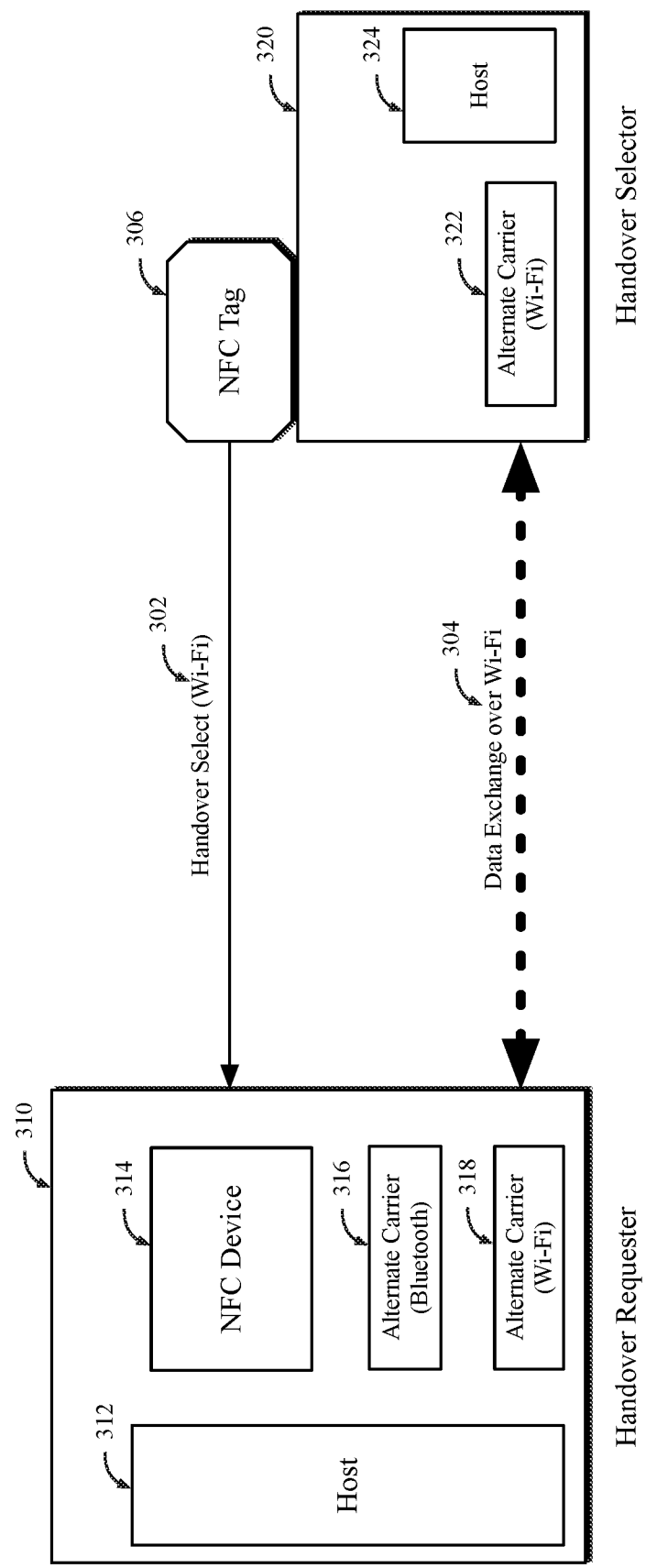
FIG. 3 illustrates a system of one-way authentication to establish a connection to facilitate a data exchange over Wi-Fi, according to an embodiment.

FIG. 3 illustrates a system 300 of one-way authentication to establish a connection to facilitate a data exchange over Wi-Fi, according to an embodiment. One-way authentication can be performed using QR code scan, passcode input, and the like, and can also be performed using a static NFC connection handover as shown in FIG. 3. Connection handovers can be used in cases in which the amount of data to be transferred is too large to be transmitted over NFC or for situations in which data is to be streamed for a longer time. Static handovers can be performed to establishes a connection between an NFC device and an accessory or peripheral device. The NFC connection is used to set up an encrypted data exchange via another data channel, such as Wi-Fi or Bluetooth.

Static NFC handover can occur between a handover selector 320 including a host 324 and wireless data channel (e.g., alternate carrier 322, which can be Wi-Fi). The handover selector 320 can also include an NFC tag 306. The NFC tag 306 can be a passive device that transmits data when powered via electromagnetic induction from an active NFC device, such as an NFC device 314 within a handover requester 310. The handover requester 310 can include a host 312 in communication with the NFC device 314 and one or more alternate wireless carriers (e.g., alternate carrier 316, alternate carrier 318), such as, for example, Bluetooth and Wi-Fi. Host 312 of the handover requester 310 and host 312 of the handover selector 320 can be a processing system that includes an application processor, such as a processing system found in a smartphone or tablet device. Alternate carriers 316, 318, 322 can each be wireless processing systems that include a wireless radio and one or more wireless processors.

In one embodiment the handover selector 320 can select an alternate channel over which a NAN data path can be established to perform a data exchange. A handover select signal 302 can be sent via NFC upon energizing the NFC tag 306. The handover select signal 302 can include data to select a data exchange carrier, as well as data to encrypt the wireless channel over which a data exchange 304 is to occur. NAN data paths that are established using a static NFC connection handover are secure but can be improved much in the way that static PMK based NAN connections can be improved.

Embodiments described herein provide techniques to improve the security of NAN data path establishment without introducing major changes to the primitives and APIs provided by the Neighbor Awareness Networking Specification (e.g., NAN version 3.0). In one embodiment, NAN data paths are established and secured using simultaneous authentication of equals (SAE). Instead of using a pre-shared PMK or static NFC code, a PMK is derived by using asymmetric (public/private keys) cryptographic techniques between the devices that are to establish the secured data path. An attacker will be unable to determine either the password or the resulting PMK by passively observing an exchange or by interposing itself into the exchange by faithfully relaying messages between the two devices. Furthermore, an attacker is unable to determine either the password or the resulting shared key by modifying, forging, or replaying frames to an uncorrupted device. An attacker us unable to perform offline dictionary attacks on the system. Instead, the attacker is limited to one guess at the password per attack. Additionally, compromising a PMK from a previous run of the protocol does not provide any advantage to an adversary attempting to determine the password or the shared key from any other instance.

One way to introduce SAE into NAN is to introduce an SAE handshake to generate a PMK, rather than using a pre-shared PMK. A service/application layer in one device can obtain a password from a peer device by using an out-of-band (OOB) channel, such as via direct UI password input, a QR code scan, or an NFC tag read. The password acquisition may happen before NAN operations and can trigger NAN synchronization and discovery. The password acquisition may also happen after the NAN service discovery and may be triggered by NAN service discovery (follow-up) operation. When the service subscriber decides to establish a secured NDP with the service publisher, it can first start an SAE handshake to generate PMK and then continue with the secured NDP setup handshake.

However, direct injection of the SAE protocol in NAN by adding an SAE handshake on top of secured NDP setup introduces significant overhead into the NDP setup process. NDP setup on top of SAE may take significantly longer than previous versions and can damage the overall user experience. Furthermore, significant design complications are introduced when attempting to manage new SAE primitives and logic connections alongside existing NAN data path and NAN data link (NDL) primitives.

Instead, embodiments described herein provide for a NAN compact SAE protocol that allows the SAE handshake to be encapsulated into the secured NDP setup handshake. The NAN compact SAE protocol does not require any major changes to the existing NAN primitives or API and introduces zero overhead on top of the existing secured NDP setup protocol. In other embodiments described herein the NAN compact SAE protocol is extended to enable additional functionality including SAE recovery and re-setup, SAE password pre-processing, and can enable the use of a default SAE password for services or applications that do not provide an OOB password provisioning method.

In one embodiment, SAE recovery is enabled to cover a scenario in which a kernel crash occurs and the NAN firmware on a device loses all key material. SAE recovery enables the NAN host to recover the secured NDP without service/application involvement. In one embodiment, SAE re-setup enables the NAN device pair to re-establish a new secured NDP without conducting OOB authentication again, after the initial NDP is terminated.

In one embodiment, SAE password preprocessing is enabled to prevent plaintext password data being exposed when passing from the service/application layer to NAN layer. Instead of passing the password as plaintext, the OOB password is preprocessed to produce a binary string (binary password) before being passed to the NAN layer and used as input to SAE handshake.

In one embodiment a default SAE password is used in scenarios in which a service/application does not provide an OOB password provisioning method for NAN. A default SAE password can be used to generate an unauthenticated PMK/PTK, which enables data exchanged between the device pair to be encrypted at NAN layer to prevent the leaking of privacy sensitive information or data that can be used for device tracking.

Figure 4:
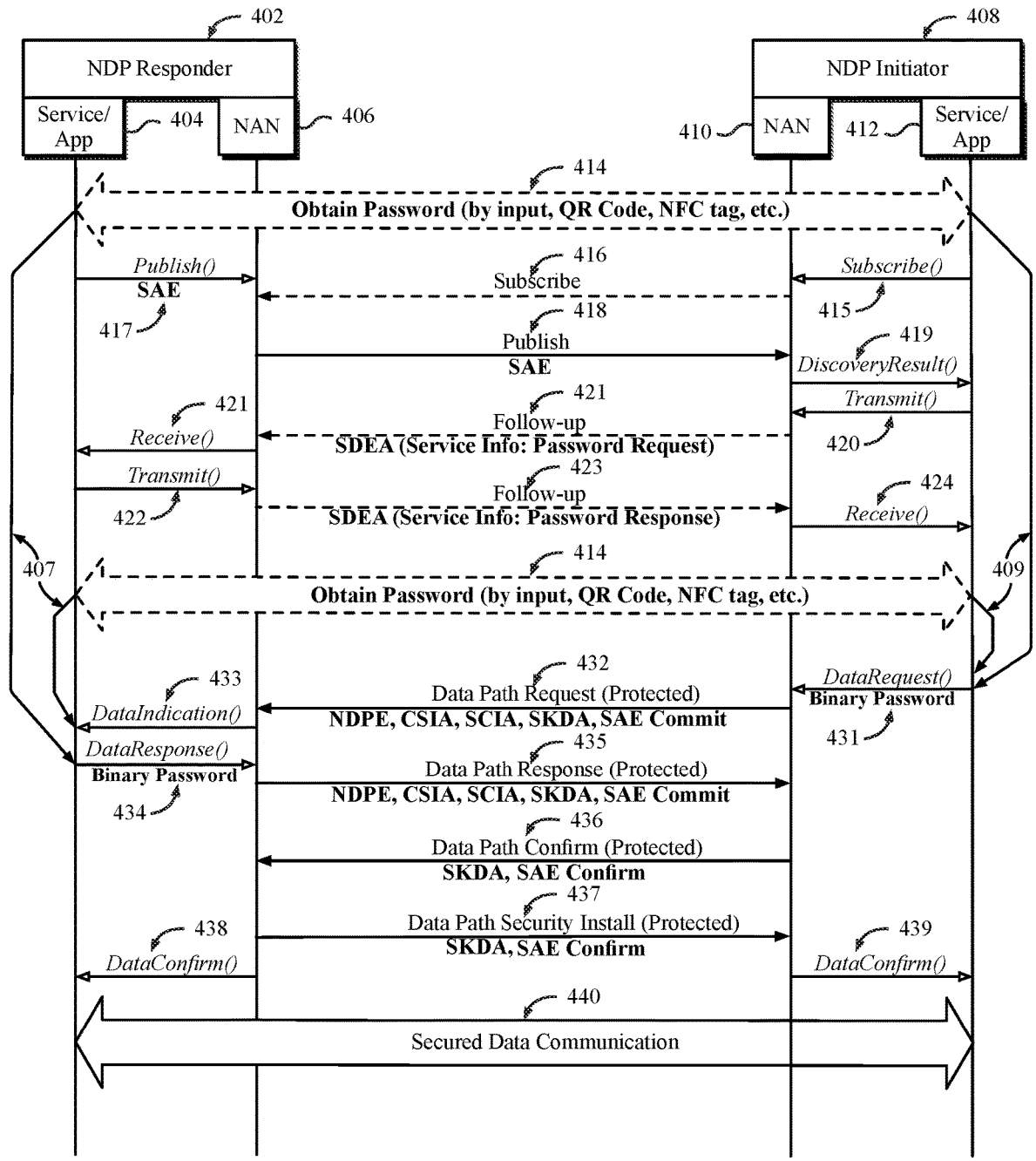
FIG. 4 illustrates a NAN compact SAE protocol, according to an embodiment.

FIG. 4 illustrates a NAN compact SAE protocol, according to an embodiment. An NDP responder 402 and NDP initiator 408 can include a service/app layer 404, 412 and NAN layer 406, 410 as in FIG. 2. An OOB password 414 can be obtained by one device from the other device using direct input, a QR code, NFC tag, etc. The OOB password 414 can be obtained before NAN operations, such as before subscribe message 415, 416 (optional) and publish message 417, 418. Obtaining the OOB password 414, in such instance, can trigger NAN synchronization and discovery. The OOB password 414 can also be obtained after NAN service discovery using NAN service discovery follow-up messages (e.g., message 421, 423). The publish messages 417, 418 can indicate to the subscriber (e.g., NDP initiator 408) that the supported cypher suite is a version of SAE. NAN layer 410 can then send a discovery result message 419 to service/app layer 412. Service/app layer 412 can respond with a transmit message 420. If the OOB password 414 has not yet been obtained, NAN layer 410 can send follow-up message to request a password. Follow-up message 421 can contain a Service Descriptor Extension attribute (SDEA) that carries a password request. A receive message 421 and transmit message 422 can be exchanged between service/app layer 404 and NAN layer 406 to report the password request and respond to the password request. NAN layer 406 can then transmit a follow-up message back to NAN layer 410. Follow-up message 423 can contain a Service Descriptor Extension attribute (SDEA) that carries a response to the password request. A receive message 424 can be relayed from NAN layer 410 and service/app layer 412 to indicate the status of the password request. If the password request is accepted, the service/app layer 404 and 412 can trigger an OOB method to acquire the OOB password 414.

Once the OOB password 414 is obtained, either before or after service discovery, a binary password can be generated at the service/application layer that obtains the password. For example, where the NDP initiator 408 receives a password provided by the NDP responder 402, the service/app layer 412 can generate a binary password based on the OOB password 414. In one embodiment, the binary password can be calculated (409) using hash function H, where binary password=H(plaintext password, version, Service Name, Service Instance Name (or Host Name), . . . ). Hash function H can be one of multiple potential hash functions. In one embodiment the hash function can be the password-based key derivation function (e.g., PBKDF1, PBKDF2, etc.), the SipHash function, or another hash function that enables sufficient randomization.

In one embodiment a default SAE password is used in scenarios in which a service/application does not provide an OOB password provisioning method for NAN. A default SAE password can be used to generate an unauthenticated PMK/PTK, which enables data exchanged between the device pair to be encrypted at NAN layer to prevent the leaking of privacy sensitive information or data that can be used for device tracking. In one embodiment the default SAE password is a binary password that is generated in a manner to minimize potential collision with a binary password generated based on a non-default password. For example, a binary password can be generated using hash function $H_d$, where binary password=$H_d$ ("default SAE password", version, Service Name, Service Instance Name (or Host Name), . . . ). Hash function $H_d$ can be any hash function described herein and may differ from hash function H that is used to generate the non-default binary password. Additionally, a different or special version number, seed, or key can be used to generate the default password than what is used to generate a non-default password.

Once a binary password for a default or non-default password is generated, service/app layer 412 can send a data request message 431 including the binary password to NAN layer 410. NAN layer 410 can then send a data path request message 432 that includes NAN parameters such as NAN data path extension (NDPE) attribute, cipher suite information attribute (CSIA), SAE attribute (SAEA), and shared key descriptor attribute (SKDA) parameters. The SAEA can include the NDP Initiator's SAE commit parameters. Service/app layer 404 and NAN layer 406 can then exchange a data indication message 433 and a data response message 434, where the data response message 434 includes a binary password. The NDPE, CSIA, SCIA, SKDA, and SAEA that includes the NDP Responder's SAE commit parameters can be sent from the NDP responder 402 to the NDP initiator 408 via the NAN data path response (e.g., message 435). The NDP initiator 408 can confirm via data path confirm message 435 including SKDA and SAEA that includes the NDP Initiator's SAE confirm parameters. The NDP responder 402 can then confirm via data path security install message 437, which also includes the SKDA and SAEA that includes the NDP Responder's SAE confirm parameters. NAN layer 406 and NAN layer 410 can then send respective data confirm message 438 and data confirm message 439 to service/app layer 404 and service/app layer 412. A secured data communication channel 440 can then be established between the NDP responder 402 and the NDP initiator 408.

Figure 5:
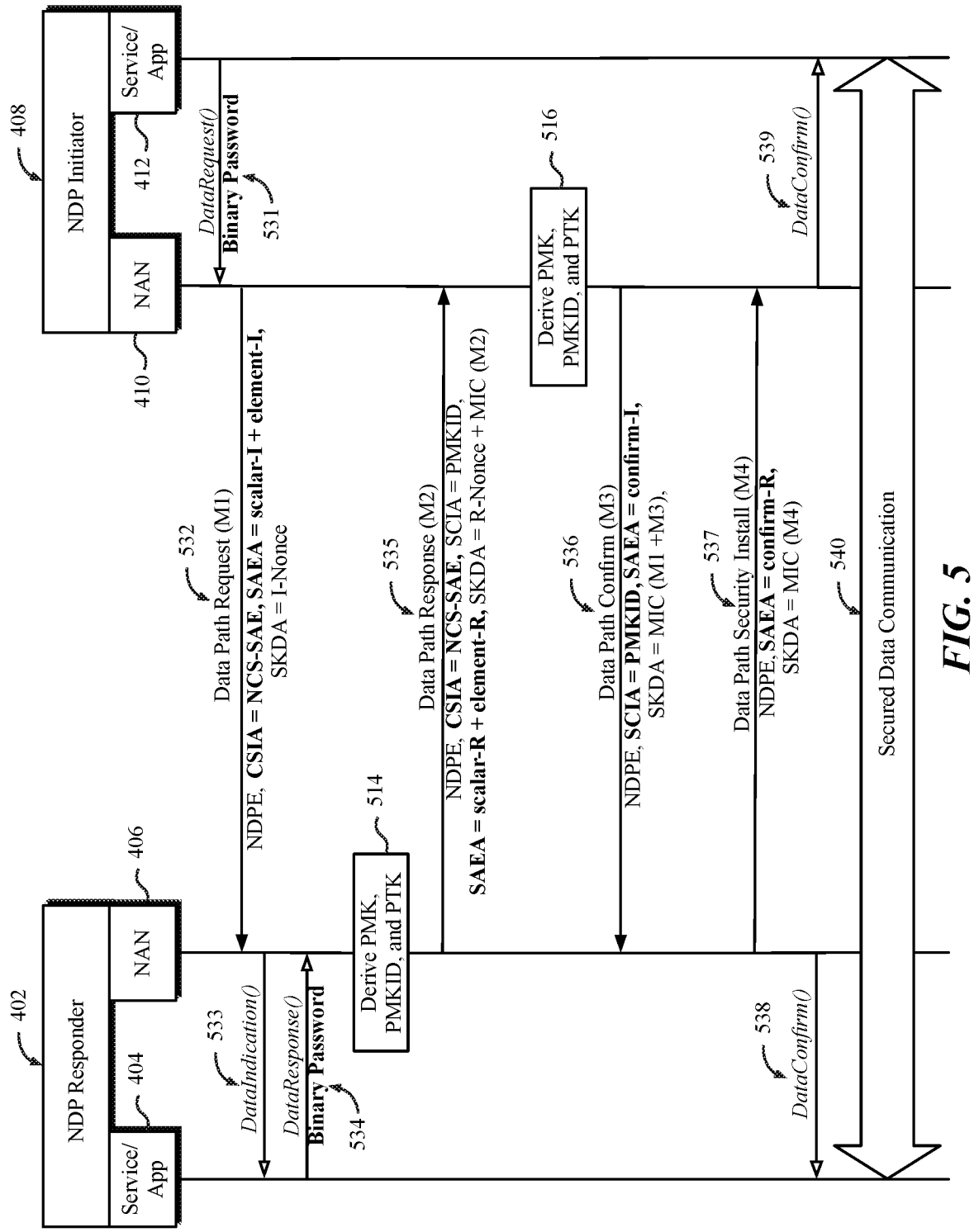
FIG. 5 provides additional detail with respect to the integration of the SAE handshake in the NDP setup handshake, according to an embodiment.

FIG. 5 provides additional detail with respect to the integration of the SAE handshake in the NDP setup handshake, according to an embodiment. In one embodiment the SAE handshake is integrated in the NDP setup handshake by integrating SAE handshake attributes within the messages of the NDP setup handshake. The SAE attributes enable runtime derivation of a PMK and PTK during the NDP handshake using SAE. Within the four-message NDP setup handshake, M1 (data path request) and M2 (data path response) convey security material used to derive the PMK and PTK. The PMK identifier (PMKID) is verified in M2 and M3, rather than in M1 and M2 as in previous NAN versions (e.g., NAN version 3.0, 2.0, etc.). Security capabilities, SAE commit/confirm material, and PTK derivation material are verified by message integrity codes (MICs) in M2, M3, and M4.

In one embodiment, service/app layer 412 can send a data request message 531 including a binary password to NAN layer 410. NAN layer 410 can then send a data path request message 532 (NDP handshake M1) NDPE, CSIA, and SKDA parameters. The NDPE can specify NAN data path extension attributes that are used during the NDP handshake, such as NDPE control variables. The SKDA can include an initiator provided cryptographic nonce value (I-Nonce). To indicate support for SAE, the CSIA can specify the NCS-SAE cipher suite. Additionally, SAE parameters can be carried by the SAEA. The SAEA can include scalar and element field data (scalar-I+element-I) that are derived from the binary password input and two random numbers at the NDP initiator 408. Other SAE parameters can also be relayed via the SAEA.

NAN layer 406 at the NDP responder 402 can receive the parameters within the data path request message 532 and send a data indication message 533 to service/app layer 404. Service/app layer 404 can reply with a data response message 534 that includes the binary password associated with the 00B password presented or transmitted to the NDP initiator 408. NAN layer 406 can then derive key material 514, which includes a PMK, PMKID, and PTK.

The NDP responder 402, via NAN layer 406, can send a data path response message 535 (NDP handshake M2) that includes NDP and SAE handshake parameters. Data path response message 535 can include NDPE, SCIA, SCIA, SAEA, and SKDA parameters. The CSIA can publish support for NCS-SAE cipher suite. The SCIA can include the PMKID from key material 514. The SAEA can include the scalar and element field data (scalar R+element R) that are derived from the binary password data within data response message 534. The SKDA can include a responder provided nonce value (R-Nonce) and a message integrity code for message M2.

NAN layer 410, after receiving the data path response message 535 can then derive key material 516, which includes a PMK, PMKID, and PTK. The NDP initiator 408, via NAN layer 410, can then send a data path confirmation message 536 (NDP handshake M3) including an SCIA that includes the PMKID from key material 516 and an SAEA that includes SAE confirmation data (confirm-I) from the NDP initiator 408. The NDP responder 402 can then send the data path security install message 537 (NDP handshake M4) that includes SAE confirmation data (confirm-R) from the NDP responder 402. NAN layer 406 and NAN layer 410 can then send respective data confirm message 538 and data confirm message 539 to service/app layer 404 and service/app layer 412 to confirm the completion of the NDP and SAE handshakes. A secured data communication channel 540 can then be established between the NDP responder 402 and the NDP initiator 408. Should any of the SAE commit or confirmation stages fail to authenticate, the secured data communication channel 540 will not be established.

In one embodiment, SAE recovery and re-setup are enabled to cover the scenarios in which: 1) a kernel crash occurs and the NAN firmware on a device loses all key material; 2) an initial NDP is terminated and a new NDP is re-established using the same OOB password. SAE recovery enables the NAN host to recover the secured NDP without service/application involvement. SAE re-setup enables a NAN device pair to re-establish a new NDP, after the initial NDP is terminated, without conducting OOB authentication again. NDP recovery and NDP re-setup may be performed using a variety of different PMK material caching strategies. The PMK material caching strategies are designed while weighing the ease of session recovery with the safety of passing certain key material between service/application layers, NAN hosts, and NAN firmware. For example, it may be safe to pass and store PMK in a NAN Host for NDP recovery purpose, but it may be risky to pass and store the PMK in the service/application layer.

Figure 6:
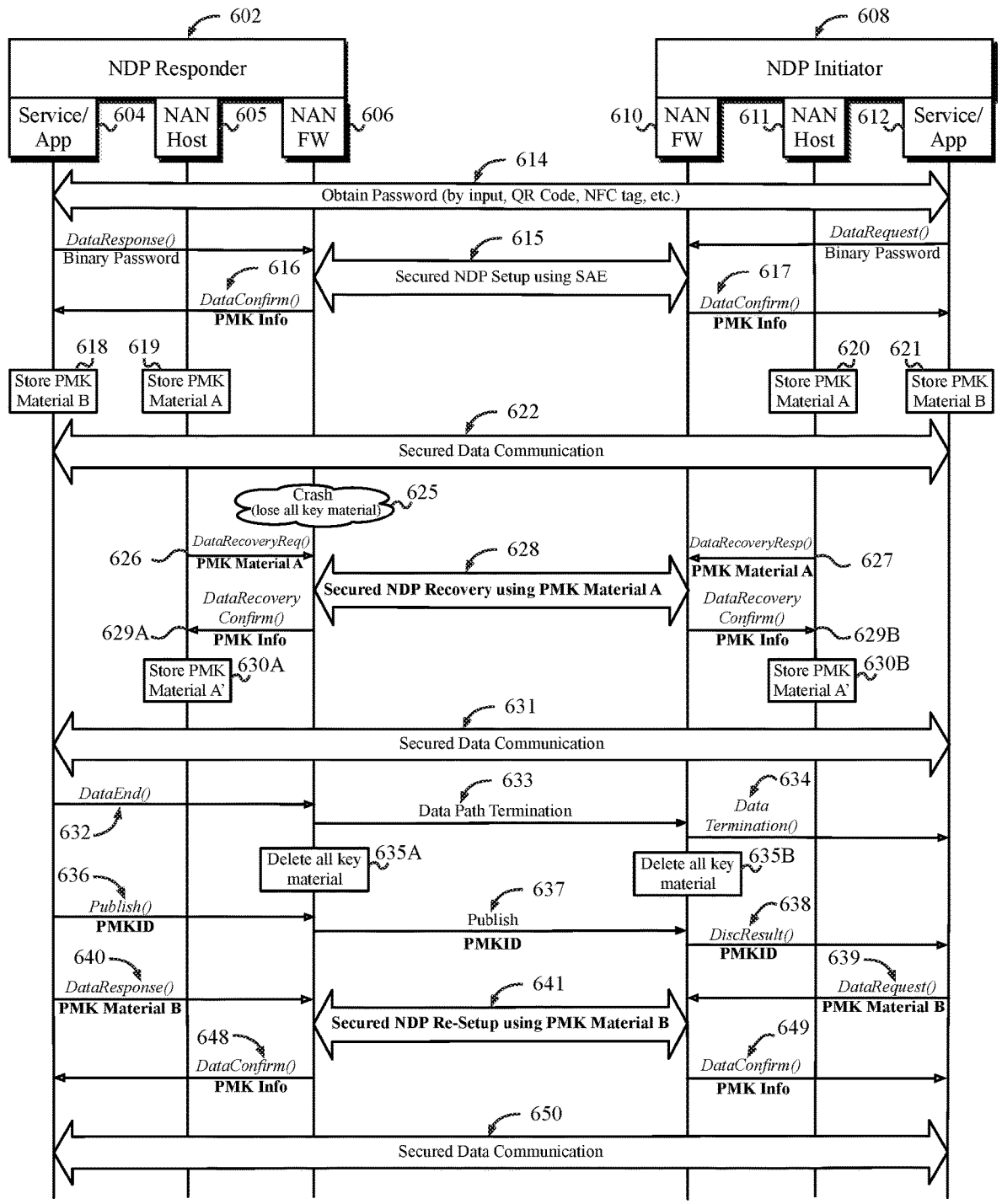
FIG. 6 illustrates SAE recovery and re-setup, according to an embodiment.

FIG. 6 illustrates SAE recovery and re-setup, according to an embodiment. SAE recovery and re-setup can be performed between an NDP responder 602 and an NDP initiator 608, which can be similar to other NDP responders and initiators described herein. NDP responder 602 includes a service/app layer 604 and a NAN layer that includes a NAN host 605 and NAN firmware 606. NDP initiator 608 also includes a NAN layer that includes NAN firmware 610 and a NAN host 611, as well as a service/app layer 612.

An 00B password 614 can be obtained via a variety of mechanism described previously, including input, QR code, NFC tag, etc. Secured NDP setup using SAE 615 can be performed using techniques shown in FIG. 4 and FIG. 5. Once PMK and PMKID are derived and verified, PMK material can be passed to the NAN host 605, 611 and service/app layers 604, 612 for NDP recovery or NDP re-setup purposes. For example, NAN firmware 606 and NAN firmware 610 can then send respective data confirm messages 616, 617 that contain PMK information. The service/app layers 604, 612 and NAN host 605, 611 can then perform operations to store key material. To enhance security, not all key material is stored with either the service/app layers or NAN host layers. Instead, the stored key material is divided into PMK material A and PMK material B. Service/app layers 604, 612 can perform operations 618, 621 to store PMK material B. NAN hosts 605, 611 can perform operations 619, 620 to store PMK material A. Once key material is stored, a secured data communication channel 622 is established between the NDP responder 402 and the NDP initiator 408.

The specific contents of PMK material A and PMK material B can vary across embodiments. In one embodiment, PMKID and element parameters (such as PE, msk and/or element) can be passed to the NAN host layers or the service/app layers for NDP recovery or NDP re-setup purposes, to avoid repeated calculations. Other PMK generation material, such as rnd is deleted, and should be newly generated in NDP recovery and NDP re-setup, for forward secrecy protection. When NDP recovery or NDP re-setup is triggered, the NAN host layer or service/app layer passes the stored PMK material to the NAN firmware. The NAN firmware reuses the stored PMK material and newly generated material (e.g. rnd) in the SAE handshake, which results in a new PMK. Alternatively, only the PMKID may be stored by both the NAN host and service/app layers. The PMKID can be calculated as Truncate-128 (Hash (element-I|element-R)). When NDP recovery or NDP re-setup is triggered, the NAN host layer or service/app layer passes the stored password (e.g., binary password) and PMKID back to the NAN firmware. The NAN firmware will then redo the SAE cipher to generate a new PMK.

Crash recovery according to one embodiment is shown in FIG. 6. Should a crash occur in the NAN firmware of a device, key material for that device may be lost. For example, should a crash 625 occur within NAN firmware 606 that results in the loss of key material, a secured NDP recovery operation 628 can be performed using PMK material A held by NAN host 605. NAN host 605 can send a data recovery request message 626 including stored PMK material A to NAN firmware 606 to request the secured NDP recovery operation 628. NAN host 611 can also send a data recovery response message 627 including PMK material A. Once the secured NDP recovery operation 628 is performed, conformation messages 629A-629B can be sent to NAN host 605, 611, which can perform operations 630A-630B to store updated PMK material A'. A secured data communication session 631 can then be re-established without re-input of the 00B password 614.

Session re-establishment, according to one embodiment, is also shown in FIG. 6. When a secured data communication session terminates, the service/app layer of a terminating device can send a data end message 632 to the NAN firmware of the terminating device. A data path termination message 633 can be sent to the NAN firmware of the other device, which can then relay a data termination message 634 to the service/app layer of the other device. Either the NDP responder 602 or the NDP initiator 608 can terminate the session. Upon session termination, the NAN firmware 606, 610 of both devices can perform an operation 635A-635B to delete all key material.

In one embodiment, a portion of the key material can be retained by the NAN host and software/app layers of the devices. For example, in one embodiment the service/app layers 604, 612 may retain the PMKID. A service publication message 636 can be sent from service/app layer 604 to NAN firmware 606. NAN firmware 606 can then send a message 637 that contains the PMKID. NAN firmware 610 can relay a discovery result message 638 containing the PMKID of message 637. Service/app layer 612 can send a data request message 639 that includes stored the PMK material B that corresponds with the PMKID. Service/app layer 604 can send a data response message 640 that includes stored PMK material B. A secured NDP re-setup operation 641 can then be performed using PMK material B. Once the secured NDP re-setup operation 641 is complete, NAN firmware 606 and NAN firmware 610 can then send respective data confirm messages 648, 649 to service/app layer 604 and service/app layer 612. The NDP responder 602 and NDP initiator 608 can then re-establish a secured data communication channel 650 without requiring re-entry of the 00B password 614.

Figure 7:
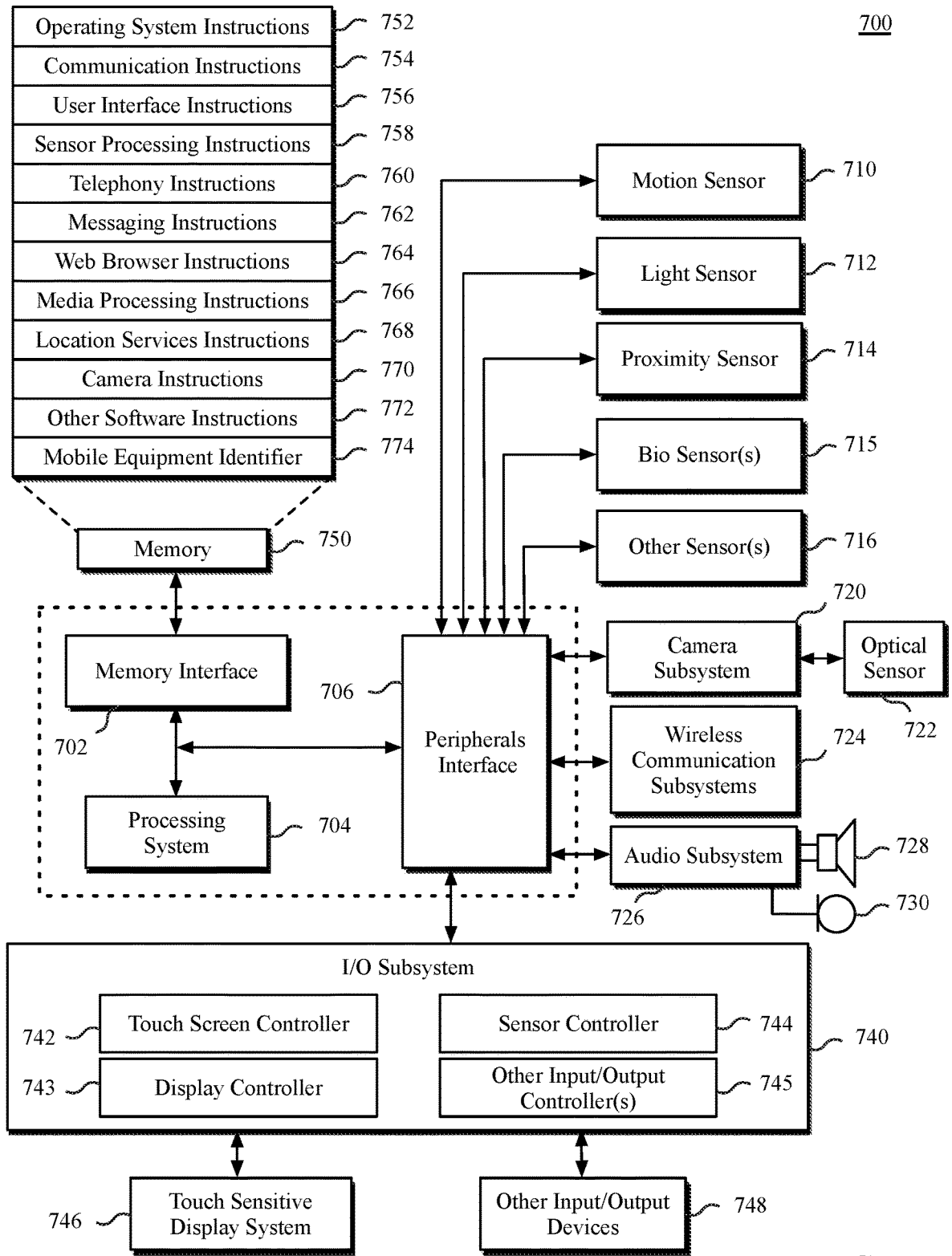
FIG. 7 is a block diagram of a device architecture for a mobile or embedded device, according to an embodiment.

FIG. 7 is a block diagram of a device architecture 700 for a mobile or embedded device, according to an embodiment. The device architecture 700 includes a memory interface 702, a processing system 704 including one or more data processors, image processors and/or graphics processing units, and a peripherals interface 706. The various components can be coupled by one or more communication buses or signal lines. The various components can be separate logical components or devices or can be integrated in one or more integrated circuits, such as in a system on a chip integrated circuit.

The memory interface 702 can be coupled to memory 750, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the mobile device functionality. One or more biometric sensor(s) 715 may also be present, such as a fingerprint scanner for fingerprint recognition or an image sensor for facial recognition. Other sensors 716 can also be connected to the peripherals interface 706, such as a positioning system (e.g., GPS receiver), a temperature sensor, or other sensing device, to facilitate related functionalities. A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the wireless communication subsystems 724 can depend on the communication network(s) over which a mobile device is intended to operate. For example, a mobile device including the illustrated device architecture 700 can include wireless communication subsystems 724 designed to operate over a GSM network, a CDMA network, an LTE network, a Wi-Fi network, a Bluetooth network, or any other wireless network. In particular, the wireless communication subsystems 724 can provide a communications mechanism over which a media playback application can retrieve resources from a remote media server or scheduled events from a remote calendar or event server.

An audio subsystem 726 can be coupled to a speaker 728 and a microphone 730 to facilitate voice-enabled functions, such as voice recognition, voice replication, digital recording, and telephony functions. In smart media devices described herein, the audio subsystem 726 can be a high-quality audio system including support for virtual surround sound.

The I/O subsystem 740 can include a touch screen controller 742 and/or other input controller(s) 745. For computing devices including a display device, the touch screen controller 742 can be coupled to a touch sensitive display system 746 (e.g., touch-screen). The touch sensitive display system 746 and touch screen controller 742 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 746. Display output for the touch sensitive display system 746 can be generated by a display controller 743. In one embodiment, the display controller 743 can provide frame data to the touch sensitive display system 746 at a variable frame rate.

In one embodiment, a sensor controller 744 is included to monitor, control, and/or processes data received from one or more of the motion sensor 710, light sensor 712, proximity sensor 714, or other sensors 716. The sensor controller 744 can include logic to interpret sensor data to determine the occurrence of one or more motion events or activities by analysis of the sensor data from the sensors.

In one embodiment, the I/O subsystem 740 includes other input controller(s) 745 that can be coupled to other input/control devices 748, such as one or more buttons, rocker switches, thumb-wheel, infrared port, USB port, and/or a pointer device such as a stylus, or control devices such as an up/down button for volume control of the speaker 728 and/or the microphone 730.

In one embodiment, the memory 750 coupled to the memory interface 702 can store instructions for an operating system 752, including portable operating system interface (POSIX) compliant and non-compliant operating system or an embedded operating system. The operating system 752 may include instructions for handling basic system services and for performing hardware dependent tasks. In some implementations, the operating system 752 can be a kernel.

The memory 750 can also store communication instructions 754 to facilitate communicating with one or more additional devices, one or more computers and/or one or more servers, for example, to retrieve web resources from remote web servers. The memory 750 can also include user interface instructions 756, including graphical user interface instructions to facilitate graphic user interface processing.

Additionally, the memory 750 can store sensor processing instructions 758 to facilitate sensor-related processing and functions; telephony instructions 760 to facilitate telephone-related processes and functions; messaging instructions 762 to facilitate electronic-messaging related processes and functions; web browser instructions 764 to facilitate web browsing-related processes and functions; media processing instructions 766 to facilitate media processing-related processes and functions; location services instructions including GPS and/or navigation instructions 768 and Wi-Fi based location instructions to facilitate location based functionality; camera instructions 770 to facilitate camera-related processes and functions; and/or other software instructions 772 to facilitate other processes and functions, e.g., security processes and functions, and processes and functions related to the systems. The memory 750 may also store other software instructions such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. A mobile equipment identifier, such as an International Mobile Equipment Identity (IMEI) 774 or a similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions may be implemented in hardware and/or in software, including in one or more signal processing and/or application specific integrated circuits.

Figure 8:
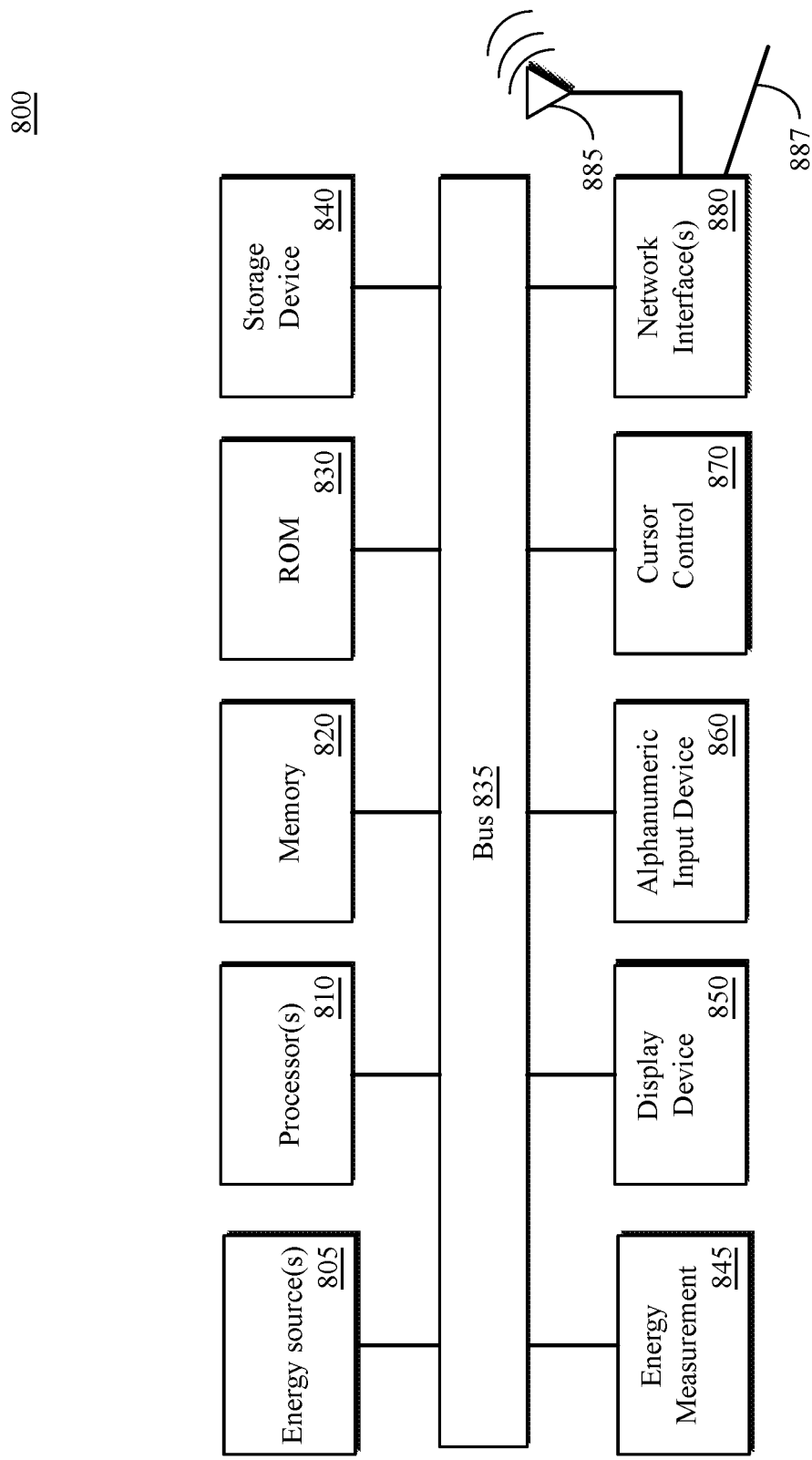
FIG. 8 is a block diagram of a computing system, according to an embodiment.

FIG. 8 is a block diagram of a computing system 800, according to an embodiment. The illustrated computing system 800 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 800 can be used to provide the computing device and/or a server device to which the computing device may connect.

The computing system 800 includes bus 835 or other communication device to communicate information, and processor(s) 810 coupled to bus 835 that may process information. While the computing system 800 is illustrated with a single processor, the computing system 800 may include multiple processors and/or co-processors. The computing system 800 further may include memory 820, such as random-access memory (RAM) or other dynamic storage device coupled to the bus 835. The memory 820 may store information and instructions that may be executed by processor(s) 810. The memory 820 may also be used to store temporary variables or other intermediate information during execution of instructions by the processor(s) 810.

The computing system 800 may also include read only memory (ROM) 830 and/or another data storage device 840 coupled to the bus 835 that may store information and instructions for the processor(s) 810. The data storage device 840 can be or include a variety of storage devices, such as a flash memory device, a magnetic disk, or an optical disc and may be coupled to computing system 800 via the bus 835 or via a remote peripheral interface.

The computing system 800 may also be coupled, via the bus 835, to a display device 850 to display information to a user. The computing system 800 can also include an alphanumeric input device 860, including alphanumeric and other keys, which may be coupled to bus 835 to communicate information and command selections to processor(s) 810. Another type of user input device includes a cursor control 870 device, such as a touchpad, a mouse, a trackball, or cursor direction keys to communicate direction information and command selections to processor(s) 810 and to control cursor movement on the display device 850. The computing system 800 may also receive user input from a remote device that is communicatively coupled via one or more network interface(s) 880.

The computing system 800 further may include one or more network interface(s) 880 to provide access to a network, such as a local area network. The network interface(s) 880 may include, for example, a wireless network interface having antenna 885, which may represent one or more antenna(e). The computing system 800 can include multiple wireless network interfaces such as a combination of Wi-Fi, Bluetooth®, near field communication (NFC), and/or cellular telephony interfaces. The network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, the network interface(s) 880 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 800 can further include one or more energy sources 805 and one or more energy measurement systems 845. Energy sources 805 can include an AC/DC adapter coupled to an external power source, one or more batteries, one or more charge storage devices, a USB charger, or other energy source. Energy measurement systems include at least one voltage or amperage measuring device that can measure energy consumed by the computing system 800 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the hardware can use an instruction set which may be an extension to an instruction set architecture for a particular type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

Figure 9:
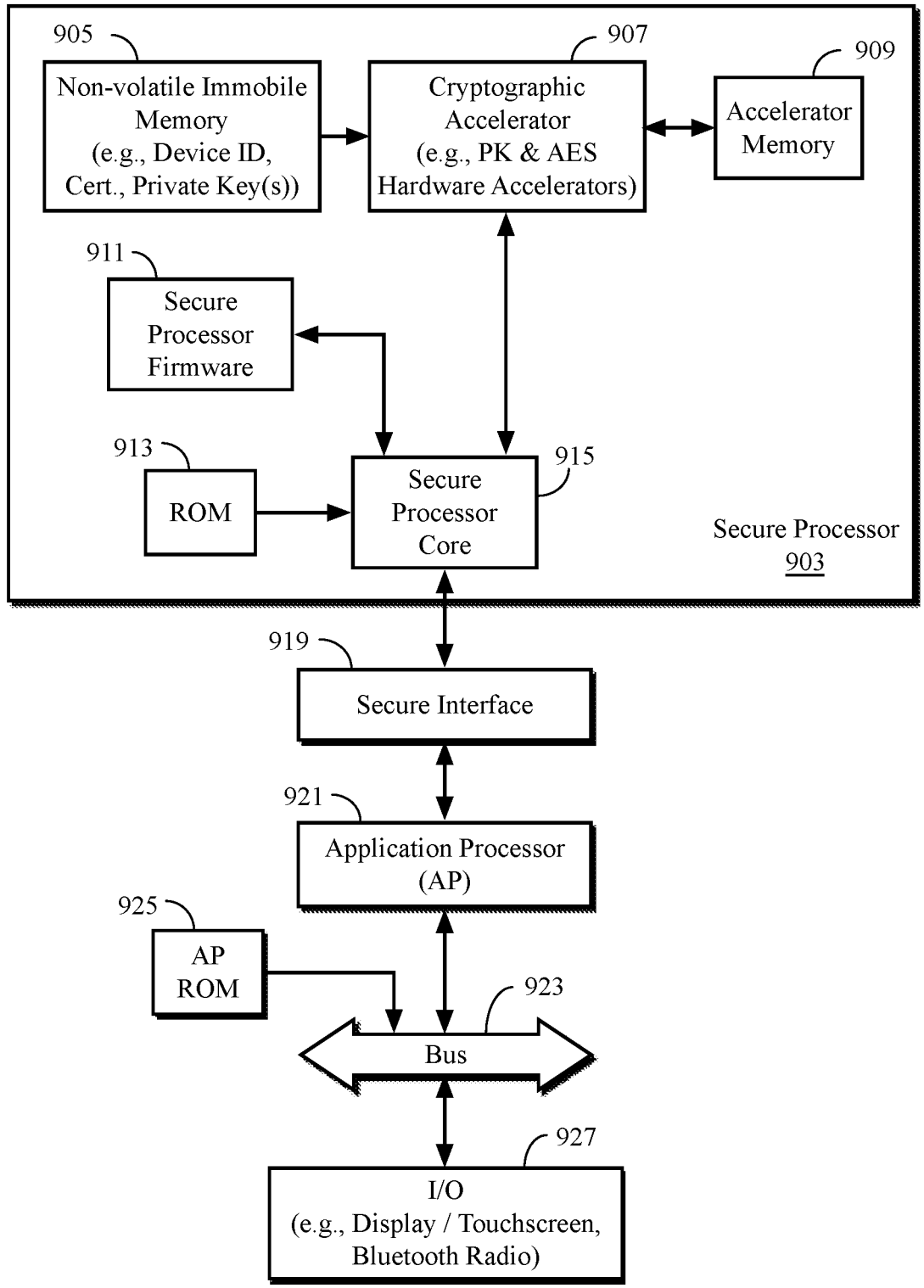
FIG. 9 illustrates a computing system including a secure processor, according to an embodiment.

FIG. 9 illustrates a computing system 900 including a secure processor, according to an embodiment. In one embodiment the illustrated secure processor 903 is a secure enclave processor, although other types of secure processors may be used to accelerate cryptographic operations described herein. The computing system 900 can enable a device to perform secure accelerated cryptographic operations, to provide secure storage for a subset of private keys, and to enable the encryption of other private keys. A version of the computing system 900 can be included in a primary device (e.g., smartphone) and a secondary device (e.g., computing device, wearable device, wireless accessory) as described herein.

The computing system 900 includes an application processor 921 that is communicably coupled with a secure processor 903 via a secure interface 919. The computing system 900 can be a portion of any of the client devices described herein. Additionally, the computing system 900 can be included into one or more of the servers described herein. In one embodiment, the secure processor 903 can be implemented as a system on chip. In another embodiment, the application processor 921 and the secure processor 903 can be implemented on a system on chip and include one or more processors and memory controllers and other components on a single integrated circuit.

The secure processor 903 can perform cryptographic operations as described herein, as well as other system security operations such as encrypting user files or verifying code signatures, processing user passcodes, or performing other security operations. The cryptographic operations can be performed in part by the secure processor core 915 by executing software stored as firmware 911 in the secure processor 903. The secure processor core 915 can also be coupled to a ROM 913 which can be trusted software that can validate the software in the firmware 911 before allowing that firmware to execute by checking a code signature of the firmware and verifying that the signature code indicates that the firmware is valid and has not been corrupted before allowing the firmware to be executed by the secure processor core 915.

The secure processor 903 can also include a cryptographic accelerator such as cryptographic accelerator 907 which can perform asymmetric cryptography as well as symmetric cryptography using a hardware accelerator. The cryptographic accelerator 907 can be coupled to memory 905, which may be non-volatile and immutable memory that can be used to store a device identifier or a set of device identifiers a secure manner. The memory 905 can also be used to store a set of one or more certificates and private keys which are hidden from the rest of the system and are not readable by the rest of the system in one embodiment. The cryptographic accelerator 907 has access to the private keys and other data within the memory 905 and access to the memory 905 is not allowed for components outside of the secure processor 903. In one embodiment, the cryptographic accelerator 907 can be coupled to an accelerator memory 909 which can be a scratch pad memory used to perform the cryptographic operations that are performed by the cryptographic accelerator 907. The application processor 921 can be coupled to one or more buses 923 which are coupled to one or more input and output (I/O) devices 927, such as a touchscreen display a Bluetooth radio, an NFC radio, a Wi-Fi radio, etc. Other input and output devices can be included. The application processor 921 is also coupled to an application processor ROM 925, which provides software to boot the application processor. Similarly, the ROM 913 provides code to boot the secure processor core 915 within the secure processor 903.

FIG. 10 is a flow diagram illustrating a method 1000 that enables a NAN compact SAE protocol, according to an embodiment. The NAN compact SAE protocol enables encapsulation of SAE handshake messages into the secured NDP setup handshake. Method 1000 can be performed by hardware and software logic that establishes neighborhood awareness networking datapaths. Operations of method 1000 can conform largely to the NAN compact SAE protocol sequence illustrated in FIG. 4 and FIG. 5. Method 1000 can be used to enhance the security of one-way authentication techniques that are used, for example, to establish a wireless connection over Wi-Fi to facilitate a data exchange. One-way authentication can be performed using QR code scan, passcode input, and similar techniques. One-way authentication can also be performed using a static NFC connection.

Method 1000 includes operation 1002, which detects, during a discovery window, a neighboring client station that is to perform peer-to-peer Wi-Fi communication via a Neighbor Awareness Networking (NAN) protocol. Method 1000 then proceeds to operation 1004 to negotiate, after the discovery window, NAN protocol parameters for a datapath with the neighboring client station. The negotiation of operation 1004 includes exchanging NAN data path setup attributes in parallel with an exchange of attributes for an encryption cipher. The encryption cipher can be based on a simultaneous authentication of equals (SAE) protocol. The negotiation can additionally include performing a NAN data path setup handshake process that includes sending or receiving a data path request message, a data path response message, a data path confirm message, and a data path security install message. The negotiation can also include an SAE handshake that includes sending or receiving at least one SAE commit message and at least one SAE confirm message.

Method 1000 additionally includes operation 1006, which generates key material to encrypt the datapath using the SAE protocol. The key material can be generated based on binary password material that is based on a password that is received from the neighboring client station via an out-of-band channel or a password that is generated and presented via the out-of-band channel with the neighboring client station. In the absence of an out-of-band password, in one embodiment a default password may be used. The default password can be a binary password generated via a hash function. An out-of-band password that is generated or received can also be converted to a binary password via the hash function. One or more SAE protocol attributes can be generated based on the binary password.

Method 1000 then proceeds to operation 1008, which establishes the datapath with the neighboring client station. Once a datapath is established, the NAN compact SAE protocol described herein can also be used to enable SAE recovery and re-setup, as shown in FIG. 6 In one embodiment, SAE recovery is enabled to cover a scenario in which a kernel crash occurs and the NAN firmware on a device loses all key material. SAE recovery enables the NAN host to recover the secured NDP without service/application involvement. In one embodiment, SAE re-setup enables the NAN device pair to re-establish a new secured NDP without conducting OOB authentication again, after the initial NDP is terminated. To enable SAE re-setup, method 1000 includes operation 1010, which stores a portion of the key-material to enable subsequent re-setup of the datapath.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of a neighbor awareness networking system have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An apparatus comprising:
a memory; and
at least one processor in communication with the memory, wherein the at least one processor is configured to:
detect, during a discovery window, a neighboring client station that is to perform peer-to-peer Wi-Fi communication via a Neighbor Awareness Networking (NAN) protocol; and
establish, via a negotiation after the discovery window, a datapath with the neighboring client station that is detected during the discovery window, wherein the negotiation includes an exchange of NAN data path setup attributes in parallel with an exchange of attributes for an encryption cipher, wherein the encryption cipher is based on a simultaneous authentication of equals (SAE) protocol, and wherein the SAE protocol is used to generate key material to encrypt the datapath.

2. The apparatus as in claim 1, wherein the negotiation includes a NAN data path setup handshake, the NAN data path setup handshake including a data path request message, a data path response message, a data path confirm message and a data path security install message.

3. The apparatus as in claim 1, wherein the negotiation includes an SAE handshake, the SAE handshake including at least one SAE commit message and at least one SAE confirm message.

4. The apparatus as in claim 1, wherein the at least one processor is to generate a password and cause a transmission or presentation of the password to the neighboring client station via an out-of-band channel.

5. The apparatus as in claim 1, wherein the at least one processor is to receive a password from the neighboring client station via an out-of-band channel.

6. The apparatus as in claim 1, additionally comprising a NAN protocol enabled communications device coupled with the at least one processor, the NAN protocol enabled communications device including at least one antenna, at least one radio coupled to the at least one antenna, and at least one processor.

7. The apparatus as in claim 6, wherein the NAN protocol enabled communications device is to perform at least one of Wi-Fi communication or Bluetooth communication.

8. The apparatus as in claim 6, wherein the NAN protocol enabled communications device is to:
generate a default password, wherein the default password is a binary password generated via a hash function, the default password used to generate key material to encrypt the datapath in absence of a password supplied by the at least one processor; and
generate one or more SAE protocol attributes based on the binary password.

9. The apparatus as in claim 6, wherein the at least one processor is to:
generate or receive a password, the password used to generate key material to encrypt the datapath;
convert the password to a binary password via a hash function; and
transmit the binary password to the NAN protocol enabled communications device.

10. The apparatus as in claim 9, wherein the NAN protocol enabled communications device is to generate one or more SAE protocol attributes based on the binary password received from the at least one processor.

11. The apparatus as in claim 10, wherein the at least one processor is to store at least a first portion of the key material in the memory, the NAN protocol enabled communications device is to internally store at least a second portion of the key material, and the NAN protocol enabled communications device is to recover or re-setup the datapath with the neighboring client station via at least the first portion of the key material or the second portion of the key material.

12. A non-transitory machine-readable medium storing instructions to cause one or more processors of an electronic device to perform one or more operations comprising:
detecting, during a discovery window, a neighboring client station that is to perform peer-to-peer Wi-Fi communication via a Neighbor Awareness Networking (NAN) protocol;
negotiating, after the discovery window, NAN protocol parameters for a datapath with the neighboring client station that is detected during the discovery window, wherein the negotiating includes exchanging NAN data path setup attributes in parallel with an exchange of attributes for an encryption cipher, wherein the encryption cipher is based on a simultaneous authentication of equals (SAE) protocol;
generating key material to encrypt the datapath using the SAE protocol; and
establishing the datapath with the neighboring client station.

13. The non-transitory machine-readable medium as in claim 12, wherein the negotiating includes performing a NAN data path setup handshake process and the NAN data path setup handshake process including a data path request message, a data path response message, a data path confirm message, and a data path security install message.

14. The non-transitory machine-readable medium as in claim 12, wherein the negotiating includes an SAE handshake, the SAE handshake including at least one SAE commit message and at least one SAE confirm message.

15. The non-transitory machine-readable medium as in claim 12, the operations additionally comprising generating a password and transmitting or presenting the password to the neighboring client station via an out-of-band channel.

16. The non-transitory machine-readable medium as in claim 12, the operations additionally comprising receiving a password from the neighboring client station via an out-of-band channel.

17. The non-transitory machine-readable medium as in claim 12, the operations additionally comprising:
via a NAN protocol enabled communications device coupled with the one or more processors:
generating a default password, wherein the default password is a binary password generated via a hash function, the default password used to generate key material to encrypt the datapath in absence of an out-of-band password supplied by the one or more processors; and
generating one or more SAE protocol attributes based on the binary password.

18. The non-transitory machine-readable medium as in claim 12, the operations additionally comprising:
generating or receiving a password used to generate key material to encrypt the datapath;
convert the password to a binary password via a hash function; and
transmit the binary password to a NAN protocol enabled communications device coupled with the one or more processors.

19. The non-transitory machine-readable medium as in claim 18, wherein the NAN protocol enabled communications device is to generate one or more SAE protocol attributes based on the binary password.

20. The non-transitory machine-readable medium as in claim 19, the operations additionally comprising storing at least a first portion of the key material in a memory coupled with the one or more processors, wherein the NAN protocol enabled communications device is to internally store at least a second portion of the key material, and the NAN protocol enabled communications device is to recover or re-setup the datapath with the neighboring client station via at least the first portion of the key material or the second portion of the key material.

* * * * *